Figure 1:
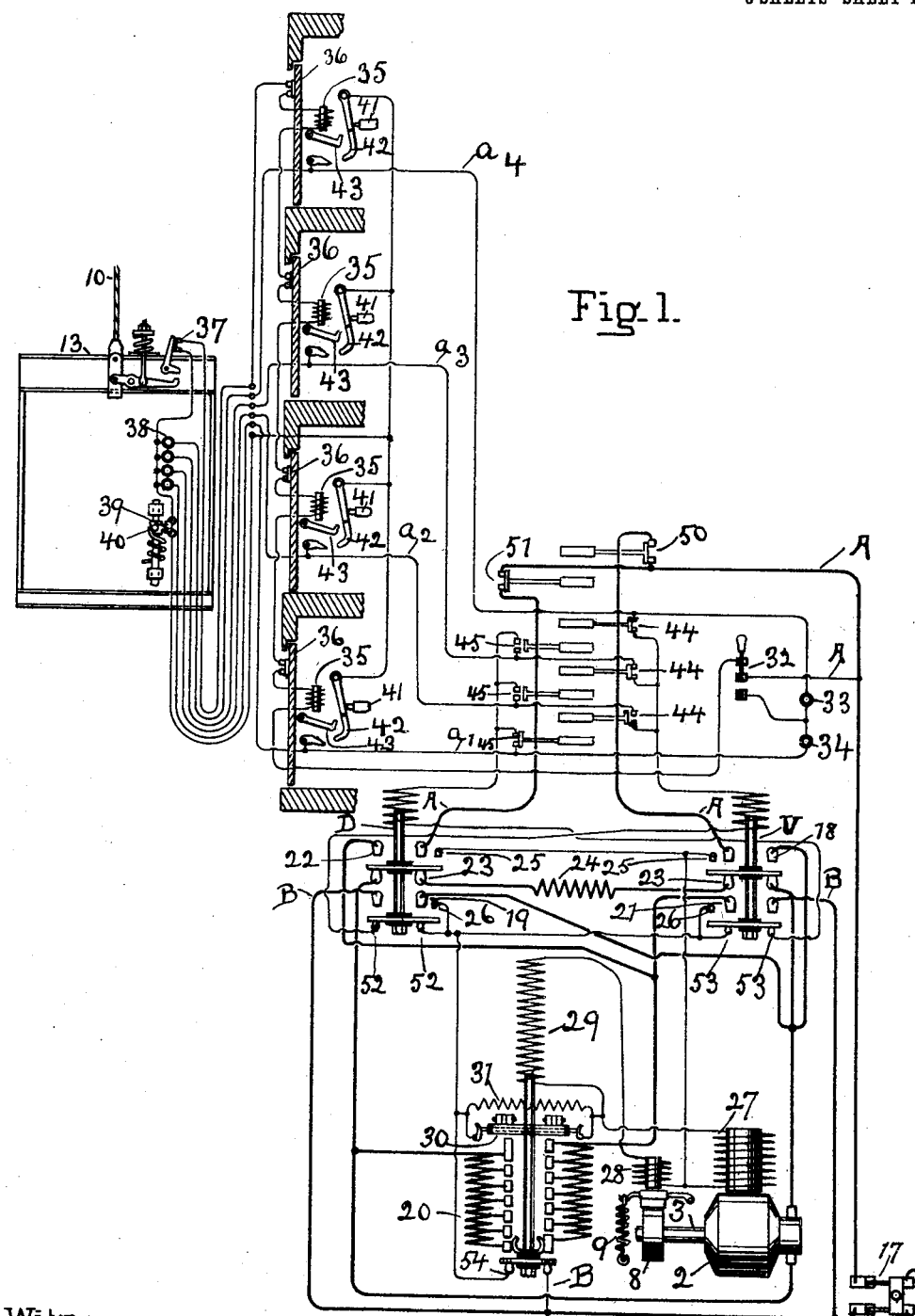

No. 783,174. PATENTED FEB. 21, 1905.
E. R. CARICHOFF.
SYSTEM OF ELECTRICAL CONTROL.
APPLICATION FILED AUG. 9, 1898.

3 SHEETS—SHEET 1.

Witnesses
Samuel W. Balch
H. H. Whitman

Inventor
Eugene R. Carichoff
By Thomas Ewing Jr.
Attorney

No. 783,174. PATENTED FEB. 21, 1905.
E. R. CARICHOFF.
SYSTEM OF ELECTRICAL CONTROL.
APPLICATION FILED AUG. 9, 1898.

3 SHEETS—SHEET 2.

Witnesses:
Samuel W. Balsh
H. H. Whitman

Inventor
Eugene R. Carichoff,
by Thomas Ewing Jr.
Attorney

No. 783,174. PATENTED FEB. 21, 1905.
E. R. CARICHOFF.
SYSTEM OF ELECTRICAL CONTROL.
APPLICATION FILED AUG. 9, 1898.
3 SHEETS—SHEET 3.
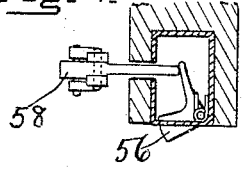
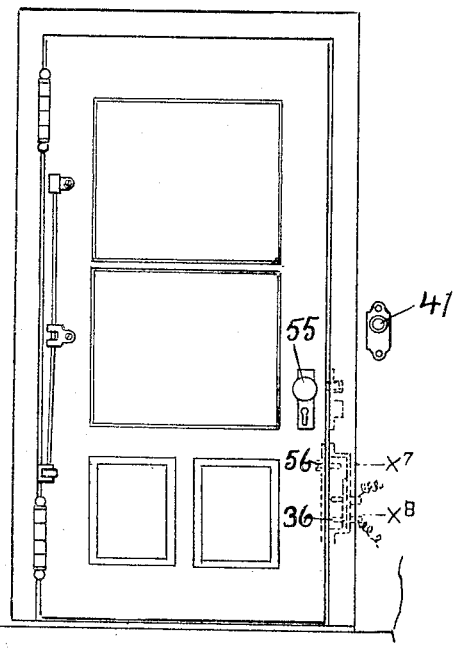
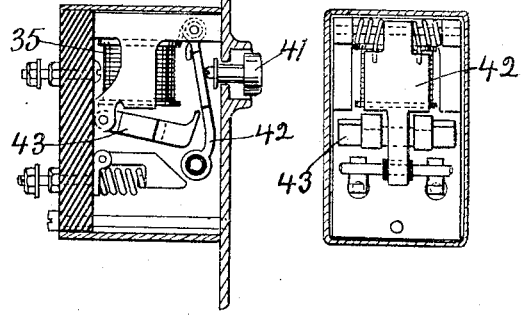
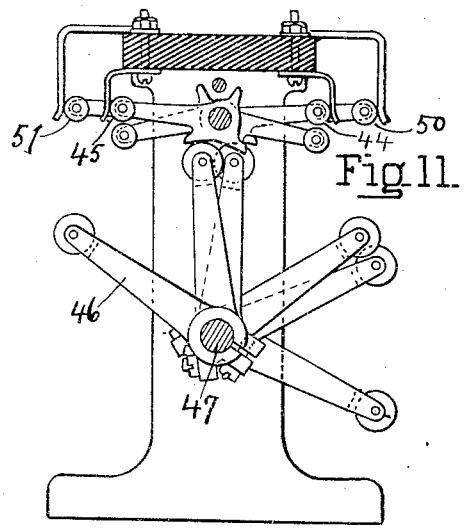
Witnesses:
Samuel W. Balch
H. H. Whitman
Inventor
Eugene R. Carichoff
by Thomas Ewing, Jr.
Attorney No. 783,174.

Patented February 21, 1905.

UNITED STATES PATENT OFFICE.

EUGENE R. CARICHOFF, OF EAST ORANGE, NEW JERSEY, ASSIGNOR TO SPRAGUE ELECTRIC COMPANY, A CORPORATION OF NEW JERSEY.

SYSTEM OF ELECTRICAL CONTROL.

SPECIFICATION forming part of Letters Patent No. 783,174, dated February 21, 1905.

Application filed August 9, 1898. Serial No. 688,182.

*To all whom it may concern:*

Be it known that I, EUGENE R. CARICHOFF, a citizen of the United States of America, and a resident of East Orange, in the county of Essex and State of New Jersey, have invented certain new and useful Improvements in Systems of Electrical Control, of which the following is a specification.

On these improvements provisional application for patent was filed in Great Britain on May 26, 1898, No. 12,016; application for patent was filed in France, March 3, 1898, and issued as a patent June 13, 1898, No. 275,549, and application for patent was also filed in France on June 1, 1898, Serial No. 266,259.

These improvements relate especially to a system of electrical control for elevators. The drawings illustrate an elevator which is operated by an electric motor the circuits of which are electrically controlled. Two sets of contacts are provided, one of which connects the motor-armature to the source of current-supply in the one direction and the other of which connects the motor in the opposite direction, thereby forming a reverser for the motor. A rheostat is also provided for varying the resistance in the armature-circuit. Its mechanism is separate from the sets of contacts for connecting the motor to the source of supply, since its action needs to be gradual, while it is desirable that the contacts connecting to the source of supply should open and close instantaneously. Between the rheostat and the means for operating the sets of contacts are devices for preventing the operation of the rheostat to cut out resistance until one of the sets of contacts has been closed and for preventing the closure of either set of contacts if the other set is closed or resistance is cut out at the rheostat.

This system of control, though not limited to such application, is applicable to an elevator mechanism in which the counterweight exceeds the weight of the car. This excess is usually made equal to the average load that the car is expected to carry. Consequently when the elevator is going up if the load is less than the excess counterweight the hoisting mechanism will drive the dynamo-electric machine, and it will run as a generator and pay energy to the line; but if the load is greater than the excess counterweight the machine will run as a motor. When the elevator is going down, both of the above conditions will be reversed. A shunt-machine when connected to leads on which a constant potential is maintained tends to run at a certain speed regardless of whether it is called upon to act as a generator or as a motor. The "motor," as the machine will be called for brevity, will therefore hold the elevator at a constant speed regardless of whether it is running with or against the load; but under the usual conditions of elevator service such a motor would start too rapidly if the load in the car is such that the hoisting mechanism will run of its own accord in the same direction. This difficulty is avoided by providing the motor with a strong field while the armature is being connected to the leads and the resistance is being cut out and having the motor so wound and geared that it will drive the elevator at a slower speed than is required for service. After the connections have been made and the resistance in the armature-circuit has been cut out the desired service speed is obtained by weakening the field.

The elevator, as shown in the drawings, is intended for light service in houses where it is not desirable to employ a skilled attendant. With this end in view the control system is arranged so that the closure at a button at any landing will cause the elevator-car to travel toward and stop automatically at that landing. Buttons which correspond to the several landings are located within the car, and these are so connected that the closure of the button corresponding to a given landing will cause the car to travel toward that landing and automatically stop at the landing. These buttons may be considered as master controlling-switches for the driving-motor-controlling mechanism. In working out these features various novel features have been introduced. Upon the closure of the controlling-circuit at a car push-button or any landing push-button the unoperated push-buttons at the several landings are simultaneously locked open, so that no conflicting circuit can be established at another point. The wire from each landing push-button is connected to the up or down controlling-circuit accordingly as the car requires to be brought up or down to the landing at which the button is located. Furthermore, the controlling-circuit comprises actuating and maintaining circuits for the reverser-operating means, which are independent of the motor-circuit and are so arranged that the actuating-circuit may be interrupted without interrupting the maintaining-circuit.

Figure 2:
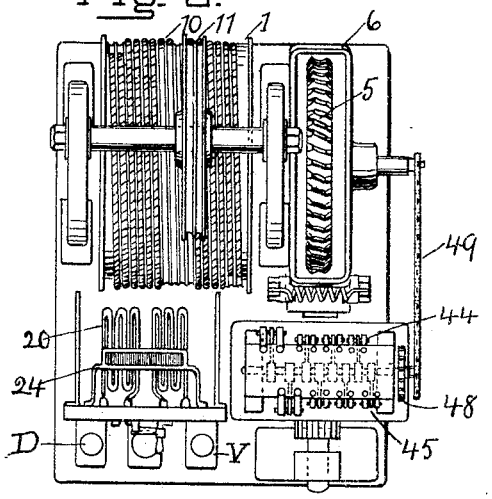
Figure 3:
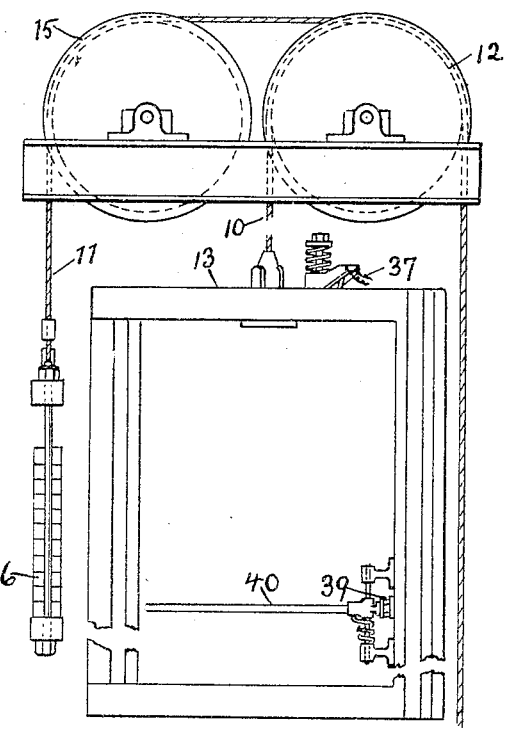
Figure 3:
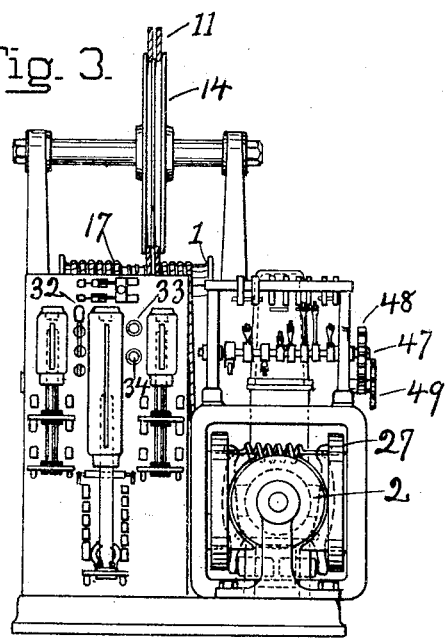
Figure 4:
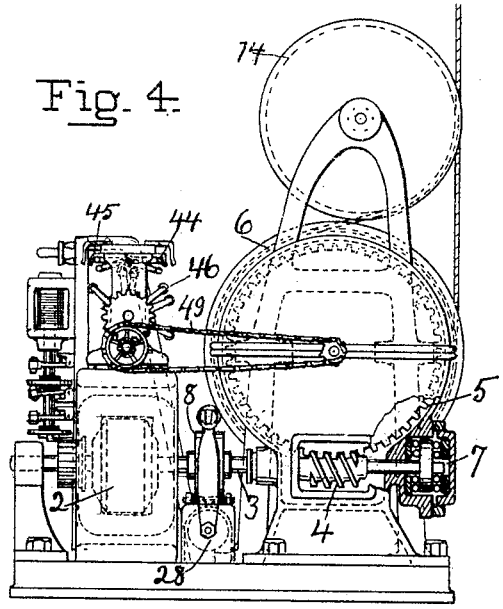

In the accompanying drawings, which form a part of this specification, Figure 1 is a diagram showing the wire connections between the various parts of the elevator system. Fig. 2 is a plan view of the hoisting mechanism, together with the main and floor limit-switches and the control apparatus, which are mounted on the same base. Fig. 3 is a view of the same from one side. Fig. 4 is a view of the same from another side, together with the car, overhead sheaves, and counterweight. Fig. 5 is a vertical section through a portion of the hoistway, showing a landing entrance-way and car broken away. Fig. 6 is an elevation of an entrance-way. Fig. 7 is a horizontal section through an automatic entrance-lock on the line $x^7$ of Fig. 6. Fig. 8 is a horizontal section through the door-switch on the line $x^8$ of Fig. 6. Figs. 9 and 10 are vertical transverse sectional views through a landing push-button. Fig. 11 is a vertical transverse section through the apparatus carrying the floor and main limit-switches.

*Hoisting mechanism.*—The hoisting mechanism consists of a winding-drum 1, suitably mounted and connected to a dynamo-electric machine or motor 2 through worm-gearing. The armature of the motor is directly coupled to the worm-shaft 3. On the worm-shaft is a worm 4, which engages with a worm-wheel 5. The threads of the worm are of such pitch that the worm-wheel may drive the worm and the machine be run as a generator instead of as a motor and convert mechanical into electrical energy and pay it to the line. In designating the machine as a "motor" it is not intended, therefore, to indicate that its function is limited to the conversion of electrical into mechanical energy. The worm and worm-wheel are covered by a casing 6, so that they may be run in oil. At the end of the worm-shaft is a thrust-bearing 7, which consists of a thrust-plate carried by the shaft and stationary thrust-plates on either side and balls or rollers interposed to reduce the friction. Also on the shaft is a brake-wheel 8, against which brakes are applied by a spring 9. The brakes are held off by a magnet, which will be described later. Car-cables 10 and counterweight-cables 11, each consisting of two ropes, are shown on the hoisting-drum. The car-cables are led from the drum directly up the hoistway and over a sheave 12 to the car 13. The counterweight-cables lead from the other side of the drum, under an idler 14, up the hoistway, and over two sheaves 15, one of which is behind the sheave 12, to the counterweight 16. The car is preferably overcounterweighted to the extent of a part of the load which the elevator is designed to carry. The dynamo-electric machine will consequently act sometimes as a motor and sometimes as a generator.

*Electrical system.*—The current for all the electrical circuits is led from two leads A B, which constitute a source of current-supply, through a main switch 17. These circuits may in a general way be grouped into three classes; but in each of the circuits are various branches. These three classes of circuits are the controlling-circuits, the resistance-controlling, field, and brake circuits, and the armature-circuits. All the circuits lead through contacts, which are controlled by two relays—an up-relay U, which is operated when the car is ascending, and a down-relay D, which is operated when the car is descending.

*The armature-circuits.*—The armature of the motor is connected to the source of current-supply in one direction or the other, according to the direction in which the car is to travel. There are branches from both the leads A and B to each relay. A branch from one brush of the motor is connected to a contact 18, through which it will be closed to lead A when the up-relay is energized. Another branch from the same brush is connected with a contact 19, through which it will be closed to lead B when the down-relay is energized. From the other brush of the machine the circuit is through a starting resistance 20, from which it branches to two contacts, one of which, 21, is closed to lead B when the up-relay is energized and the other of which, 22, is closed to lead A when the down-relay is energized. These two branches constitute, respectively, the up-circuits and the down-circuits of the motor-armature. It will therefore be seen that the energizing of either relay will connect the armature of the motor through the starting resistance to the source of supply, one relay connecting the armature to the source of supply in the opposite direction from the other, thereby forming a reverser for the motor. There is also a close-circuit through the armature, which is closed through the contacts 23 23 and stopping resistance 24 when neither relay is energized. It will be seen that the field-circuit is broken before the armature is close-circuited through the stopping resistance 24; but there is usually enough residual magnetism in the field to cause the armature to generate current and act as a dynamic brake on the machinery. If desired, the relays may merely cut resistance into the field without completely breaking the circuit, the connections being modified so that this may be done.

*Resistance-controlling brake and field circuits.*—When either relay is energized, a contact 25 is closed to lead A and a contact 26 is closed to lead B. The wire which leads from contact 25 divides into two branches. In one branch is the field-coil 27 of the dynamo-electric machine. In the other branch is the coil of the brake-magnet 28 and the solenoid 29 of the rheostat, which actuates a traveling contact-block to vary the resistance in the armature-circuit. As shown, the rheostat varies the resistance without breaking the circuit, and when in the normal position, to which it returns by gravity, all the resistance is cut in; but for some purposes this normal position might be one in which the circuit is broken after cutting in all the resistance, and I use the term "circuit-controlling switch" to designate either a switch for making and breaking the circuit or for varying the resistance therein. The two branches then unite and pass through a shunted switch 30 and thence to contact 26. The shunted switch is opened by the rheostat when it is fully operated, thus throwing resistance 31 into the circuit. This weakens the field, which increases the speed of the machine, and it saves current in the brake-magnet coil and rheostat-solenoid. The rheostat, brake, and motor field are shown partly in series and partly in parallel; but their precise arrangement in the various branches is immaterial, provided that the resistance in each branch is adjusted so that the required current will pass. The circuit through the rheostat-solenoid will be termed the "resistance-controlling" circuit.

*Controlling-circuits.*—The car can be controlled from within or from where the hoisting apparatus is located, and it can be brought by the several landing-buttons to any landing and automatically stopped. The elevator cannot be operated from the car itself or any landing if the door at any landing is open or the cable is slack and cannot be operated from any landing if the car is occupied, nor can it while a landing-button is closed be operated from any other landing. The controlling-circuits are provided with car-buttons and landing-buttons, which are the circuit-closing devices of the controlling-circuit floor limit-switches, and various safety-switches, and with two relays—one the up-relay and the other the down-relay—which control the field and brake circuits and the armature-circuits. The controlling-circuits are all branched from a wire which is connected to line A through a throw-over switch 32, by means of which the line can be connected at will to the landing system and the car-controlling system or to the push-buttons 33 34 of the control-board, which is intended to be placed near and may be mounted on the base of the hoisting apparatus, as shown. The push-buttons of the control-board are connected directly to the floor limit-switches. The wire from the lead A, which passes through the car side of the throw-over switch, passes through a locking-magnet 35 at each landing. These magnets lock the push-buttons at the landings. There is also a door-switch 36 for each landing in series in the controlling-circuits. After passing through these magnets and door-switches the wire is led to the car. First it traverses a slack-cable switch 37, and then it branches. One set of branches goes to the car-buttons 38 and through them to the landing-wires $a'$, $a^2$, $a^3$, and $a^4$, and a separate branch goes through a switch 39 of the car-gate 40 and the car-cable, whence it branches to the several landing-buttons, through which it may be closed to the several landing-wires. It is essential to operation by a landing push-button or a car push-button that all of the landing-doors and the slack-cable switch be closed, and it is essential to operation from any landing-button that the car-gate be closed. The car-gate is hinged to one corner of the car and is in front of the entrance when the car is not occupied. Its switch is closed only when in this position. It reaches entirely across the car, so that a person cannot pass around its end, and it must consequently be folded back into the car when the car is occupied and can be closed only when the car is not occupied. The landing-buttons 41 comprise a switch-arm 42, which when pushed in will close the circuit at the landing unless the circuit is open at the throw-over switch or at some other point—as, for example, the slack-cable switch, a landing-door switch, the car-gate switch—or another push-button has been closed.

When a button is pushed in and the circuit is closed, the armatures 43 of the locking-magnets are all lifted and the switch-arm of the operated push-button is locked in, and the switch-arms of the other buttons are locked out by the engagement of hooks on the ends of the armature with the switch-arms. This condition continues until the control-circuit is opened at some point. The landing-wires of the intermediate and the top landings pass through the floor limit-switches 44 and thence through the up controlling-circuit to the coil of the up-relay, and the landing-wires from the lowest landing and the intermediate landings pass through the floor limit-switches 45 and thence through the down controlling-circuit in which the down-relay coil is located. The floor limit-switches are mounted together on a slate and are opened and closed by arms 46, which are clamped to a shaft 47, connected to the drum-shaft through the gears 48 and chain 49. The arms 46 move synchronously with the drum, and hence with the elevator. These arms can be independently adjusted on the shaft, and when the elevator is set up they are are so adjusted that when the car is ascending or descending each landing-wire will be open at a floor limit-switch as the corresponding landing is approached and sufficiently in advance to give the car time to lose its momentum and stop at the landing. In the same mechanism with the floor limit-switches is an upper main limit-switch 50 and a lower main limit-switch 51. The former is in circuit with the armature of the dynamo-electric machine, the field, the brake-magnet, and the solenoid of the rheostat when the car is ascending, and the latter is similarly in circuit when the car is descending. The effect of opening either main limit-switch is the same as opening the corresponding relay-contacts, and they are to insure the cutting off of current and the stopping of the car at the limit of travel in the event of failure of the relays to operate properly. Each of the controlling-circuits is through one of two contacts 52 53, the up controlling-circuit being through contact 52, which is controlled by the down-relay, and the down controlling-circuit being through the contact 53, which is controlled by the up-relay, each being opened when its controlling-relay is energized. This arrangement prevents one relay from being energized if the other is energized, or the simultaneous operation of both relays. From contacts 52 53 connection is made to lead B through a contact 54, which is opened to interrupt the actuating-circuit for each reverser-relay as soon as the rheostat-solenoid is energized and commences to cut out resistance. This solenoid, as already explained, cannot be energized until one of the relays has operated its armature, and when this is done the maintaining-circuit branch of the controlling-circuit is closed to line at contact 26, which is independent of contact 54. This arrangement prevents the re-energizing of a relay after the circuit has been broken until the rheostat has cut in all the resistance and also permits the actuating-circuit to be interrupted at contact 54 without interrupting the maintaining-circuit of the reverser-relay, which may at the time be operated.

It will be seen that each controlling-circuit has two alternative branches—an actuating branch through the contacts 54, which are closed for throwing the reverser, and a maintaining branch through the bridging-contacts 26, which are closed by the reverser when thrown by the corresponding actuating branch for holding the reverser—and that as the rheostatic switch is actuated by a circuit controlled by the reverser the contacts 54 in the actuating branches will be broken upon closure of a controlling-circuit for the reverser and upon movement of the reverser.

The landing-doors are provided with springs, by which they are automatically closed, and with latches 55 of ordinary character, which can be retracted from either side of the door. There is an additional latch 56 in the door-jamb at each landing, which locks the door. This latch is retracted automatically when the car is opposite the landing by the engagement of a cam 57 on the car with the cam-roller 58, which is mechanically connected with the latch.

The operation of the system is as follows: Let it be assumed that the elevator-car is at the bottom of the shaft and that the apparatus is all in initial or normal position with the circuits all open, the throw-over switch 32 closed to the landings system, the door-switches all closed, and the car empty. Assume that the push-button, say, on the third landing from the bottom is then closed. Circuit is thereby closed through main switch 17 and throw-over switch 32, the locking-magnets 35 on the various landings and door-switches 36 on the various doors, through the inner strand of the loop of wires, (shown in Fig. 1 as connected to the car,) through slack-cable switch 37, car-gate switch 39 and the outer strand of the loop of wires referred to to the wire which connects the switch-arms of the various push-buttons, thence through the push-buttons on floor 3 to wire $a^3$, across the contact of the floor limit-switch connected therewith, through the coil of the up-relay U, across contacts 52 of the down-relay D, and across contacts 54 of the rheostat to lead B. All of the locking-magnets draw up their armatures 43, those on the first, second, and fourth floors, counting from the bottom up, locking out their push-buttons, while at the third floor the button is locked in. Thus interference between the different landings is prevented. The armature of the up-relay is actuated and the main motor is forthwith connected to the source of supply through the following circuits: ($a$) The armature-circuit is from lead A through main switch 17, upper main limit-switch 50, up-relay contacts 18, through the armature of the motor, through rheostat-coils 20, being the entire resistance thereof, and across contacts 21 of the up-relay to lead B. ($b$) The field-coil 27, which is in shunt with the armature, is connected with contact 25 of the up-relay and around resistance 31 with contact 26 of the down-relay. There is also a branch in parallel with the field-coil branch, which includes a brake-magnet coil 28 and a rheostat-solenoid 29. Thus it will be seen that as soon as a landing-button is pushed in the brake is lifted off the armature of the main motor, the armature and field-coils are energized, and the rheostat begins to move. The resistance of the rheostat is gradually cut out, and when it is all cut out the shunted switch 30 is opened, and the resistance 31 is thrown in with the field, thereby increasing the speed of the motor. When the car reaches the third landing, the contact 44 of the floor limit-switch will be opened, causing the push-buttons to be released, the armature of the up-relay to fall back, the motor to be instantly disconnected, the armature to be short-circuited or closed-circuited through contacts 23 of the two relays and resistance 24, and the rheostat to return by gravity to normal position. The car comes to rest and cannot be started again until rheostat-contact 54 is again closed and all the resistance is thrown into circuit with the motor-armature.

It will be clear from the foregoing how the car can be lowered or brought to any floor and that if by any chance two push-buttons should be closed simultaneously the car will go to the more distant landing and stop there and the apparatus assume normal position and that when one enters the car the push-buttons at the landings are all cut out.

In the foregoing apparatus and system there is a rheostat 20 and two directional devices D and U, which cannot be operated simultaneously, nor when the rheostat-arm or contact-block is in any other than initial position, closing contact 54, and, vice versa, the rheostat-arm can be moved away from initial position only when and while one of the directional devices is actuated, returning automatically to initial position as soon as the condition arises where neither directional device is actuated. The push-buttons 33 or 34 or the car push-buttons 38, which may be called "master-switches" or "master controller-buttons," can be opened at any instant at will to bring the car to a stop at any point along the hoistway by causing the circuit to be opened at one of the relays. Thereafter nothing can be done until the rheostat-arm has returned to initial position, closing contacts 54; but if meanwhile a push-button is closed either for up or down movement as soon as contact 54 is closed the circuits are completed and the desired operation is initiated.

It will be seen that in the system herein illustrated there is a separate set of contacts operated by relays for both directions of motion. These relays, the circuits controlling them, and the circuits which they establish between the motor and the source of supply are distingushed for convenience by the terms "up" and "down;" but the circuits resulting from the operation of one relay or the other are in all respects similar except in direction, and since the system is equally applicable to the control of other mechanism than elevators it is not intended to limit this invention to elevators and other mechanism in which there is an up-and-down movement by the employment of these terms.

Many equivalent forms of apparatus may be substituted for those shown and described in the foregoing drawings and specification without departing from the spirit of the invention, and the terms "solenoid" and "relay" are to be construed as covering any electrically-operated device which may be substituted. The terms of the claims are therefore to be broadly interpreted, so as to include such equivalent devices as are shown in this patent.

What I claim as new, and desire to secure by Letters Patent of the United States, is—

1. The combination with a motor, of a reverser, means for operating the reverser to close the motor-circuit for operation in one direction or the other, and a circuit for controlling said operating means having alternative branches one of which is through contacts closed by movement of the reverser, substantially as described.

2. The combination with a motor, of a reverser, controlling-coils for operating the reverser to close the motor-circuit for operation in one direction or the other, each controlling-coil having alternative circuit connections, one circuit connection of each coil being through contacts closed by movement of the reverser by that coil, substantially as described.

3. The combination with a motor, of a reverser therefor, actuating-circuits for throwing the reverser to close the motor-circuit for operation in one direction or the other, maintaining-circuits for each position of the reverser when thrown by the actuating circuits and contacts actuated by the movement of the reverser for closing the maintaining-circuit corresponding to the actuating-circuit by which it may be thrown, substantially as described.

4. The combination with a motor, of a reverser therefor, actuating-circuits for throwing the reverser to close the motor-circuit for operation in one direction or the other, bridging-contacts, maintaining-circuits for each position of the reverser, including the bridging-contacts, the bridging-contacts of a maintaining-circuit being closed upon the movement of the reverser by the corresponding actuating-circuit, and contacts in the actuating-circuits opened when the reverser is thrown; substantially as described.

5. The combination with a resistance-controlling switch, of a reverser, a circuit for controlling the movements thereof, having alternative branches, one of which is through contacts closed by movement of the reverser and the other of which is through contacts opened upon movement of the resistance-controlling switch; substantially as described.

6. The combination with a resistance-controlling switch, of a reverser, controlling-coils therefor, each controlling-coil having alternative circuit connections, one circuit connection of each coil being through contacts closed by movement of the reverser by that coil, and the other connection of the coils being through contacts opened upon movement of the resistance-controlling switch; substantially as described.

7. The combination with a reverser, of controlling-circuits, each of which controls the other, including actuating-coils for the reverser, the coils having alternative circuit connections, one circuit connection of each coil being through contacts closed by the movement of the reverser by that coil; substantially as described.

8. The combination with a motor and its driving-circuit, of a reverser therefor, controlling-circuits for operating the reverser to close the motor-circuit for operation in one direction or the other, said circuits having actuating and maintaining branches, bridging contacts upon the reverser and included in the maintaining branches, and normally closed contacts included in the actuating branches and opened upon closures of a controlling-circuit, substantially as described.

9. The combination with a motor, of a reverser therefor, a second switch in series in the working circuit of the motor, controlling-coils for operating the reverser to close the motor-circuit for operation in one direction or the other, each coil having alternative circuit connections, one circuit connection of each coil being through contacts closed by movement by that coil, and the other connections of the coils being through contacts opened by movement of the second switch from normal position; substantially as described.

10. The combination with a motor, and its driving-circuit, of a reverser and a circuit-controlling switch for the motor in series in the driving-circuit, controlling-circuits for the reverser, contacts upon the reverser for opening one of the controlling-circuits when thrown by the other controlling-circuit, bridging-contacts upon the reverser for closing the circuit by which it may be actuated, and contacts upon the switch in multiple with the bridging-contacts upon the reverser, and opened when the switch is moved from normal position; substantially as described.

11. The combination with a motor and its driving-circuit, of a reverser and a circuit-controlling switch for the motor in series in its driving-circuit, normally closed contacts upon the switch opened on movement thereof, bridging-contacts upon the reverser, and controlling-circuits for the reverser having actuating and maintaining branches, the actuating branches including the contacts upon the switch and the maintaining branches including the bridging-contacts, the bridging-contacts of a maintaining branch being closed upon the movement of the reverser by the corresponding actuating branch; substantially as described.

12. The combination with a motor and its driving-circuit, of a reverser and a circuit-controlling switch for the motor in series in its driving-circuit, normally closed contacts upon the switch opened on movement thereof, bridging-contacts upon the reverser, controlling-circuits for the reverser each of which controls the other and has actuating and maintaining branches, the actuating branches including the contacts upon the switch and the maintaining branches including the bridging-contacts, the bridging-contacts of a maintaining branch being closed upon movement of the reverser by the corresponding actuating branch; substantially as described.

13. The combination with a motor and its driving-circuit, of a reverser and circuit-controlling switch for the motor in series in its driving-circuit, normally closed contacts upon the switch opened on movement thereof, bridging-contacts upon the reverser, controlling-circuits for the reverser having actuating and maintaining branches, the actuating branches including the contacts upon the switch and the maintaining branches including the bridging-contacts, the bridging-contacts of a maintaining branch being closed upon the movement of the reverser by the corresponding actuating branch, and means operative upon the closure of a controlling-circuit for moving the switch; substantially as described.

14. The combination of a source of current-supply, a motor, a rheostat, electrically-actuated contacts for connecting the motor in a circuit with the source of supply, a circuit controlling the contacts, means for controlling the rheostat connections, and a circuit-closer controlled by the position of said controlling means and included in said controlling-circuit for preventing the connection of the motor in circuit with the source of supply except when said controlling means is in normal position; substantially as described.

15. The combination of a source of current-supply, a motor, a rheostat, contacts for connecting the motor in a circuit with the source of supply, means for controlling the rheostat connections, said controlling means being so constructed and arranged that it is returned to normal position by the opening of the motor-circuit, and means for preventing the connection of the motor in circuit with the source of supply except when said controlling means is in normal position, substantially as described.

16. The combination of a source of current-supply, a motor, a rheostat, means for controlling the rheostat connections, a set of contacts for connnecting the motor in a circuit with the source of supply in one direction, a set of contacts for connecting the motor in a circuit with the source of supply in the opposite direction, and means for preventing the closure of either set of contacts after the circuit has been opened until said controlling means is in normal position; substantially as described.

17. The combination with a motor, and a rheostat, and a reverser therefor, of controlling-circuits for throwing the reverser, means for preventing the simultaneous closure of the controlling-circuits and means governed by the position of the means for controlling the rheostat connections to prevent closure of the said circuits; substantially as described.

18. The combination with a motor, and a rheostat and a reverser therefor, of controlling-circuits for throwing the reverser, means for preventing the simultaneous closure of the controlling-circuits and to prevent the closure of the said circuits unless the means for controlling the rheostat connections is in position to include resistance in the motor-circuit; substantially as described.

19. The combination of a source of current-supply, a motor, a rheostat, a set of contacts for connecting the motor in a circuit with the source of supply in one direction, a set of contacts for connecting the motor in a circuit with the source of supply in the opposite direction, means for preventing the simultaneous closure of both sets of contacts, means for preventing the closure of either set of contacts after the circuit has been opened until the means for controlling the rheostat connections is in normal position, and means for close-circuiting the motor as soon as the connection of the motor to the source of supply is opened; substantially as described.

20. The combination of a source of current-supply, a motor, a rheostat, an up-relay and a down-relay for connecting the motor with the source of supply, means for operating the rheostat, and means for preventing the connection of the motor to the source of supply except when the rheostat is in normal position; substantially as described.

21. The combination with a motor, and a rheostat, of an up-circuit and a down-circuit for the motor, means for preventing the simultaneous closure of both the up-circuit and the down-circuit, and means for preventing the closure of either the up-circuit or the down-circuit except when the rheostat is in normal position; substantially as described.

22. The combination of a motor, a rheostat, an up-circuit, a down-circuit, and a resistance-controlling circuit, means for preventing the simultaneous closure of both the up-circuit and the down-circuit, and means for preventing the closure of either the up-circuit or the down-circuit except when the rheostat is in normal position; substantially as described.

23. The combination of a source of current-supply, a motor, contacts for connecting the motor in a circuit with the source of supply, an up-relay and a down-relay for controlling these contacts, an up controlling-circuit containing the up-relay coil and a contact controlled by the downrelay, a down controlling-circuit containing the down-relay coil and a contact controlled by the up-relay, a rheostat comprising a solenoid and a resistance for the motor controlled thereby, and a contact in both the up controlling-circuit and the down controlling-circuit which is controlled by this solenoid and is closed when the rheostat is in normal position; substantially as described.

24. The combination of a source of current-supply, a motor, contacts for connecting the motor in a circuit with the source of supply, contacts for close-circuiting the motor, an up-relay and a down-relay for connecting the motor to the current-supply and for closing the close-circuiting contacts when the motor is disconnected from the source of current-supply, and means controlled by said relays for preventing them from operating simultaneously to connect the motor to the source of current-supply, substantially as described.

25. The combination with a source of current-supply, a motor, contacts for connecting the motor in a circuit with the source of supply, an up-relay and a down-relay for controlling these contacts, an up controlling-circuit containing the up-relay coil and a contact controlled by the down-relay, a down controlling-circuit containing the down-relay coil and a contact controlled by the up-relay, and contacts for close-circuiting the motor when the motor is disconnected from the source of supply; substantially as described.

26. The combination of a source of current-supply, a motor, contacts for connecting the motor in a circuit with the source of supply, an up-relay and a down-relay for controlling these contacts, an up controlling-circuit-containing the up-relay coil and a contact controlled by the down-relay, a down controlling-circuit containing the down-relay coil and a contact controlled by the up-relay, contacts for close-circuiting the motor when the motor is disconnected from the source of supply, and a rheostat comprising a solenoid and a resistance for the motor controlled thereby, and a contact in both the up controlling-circuit and the down controlling-circuit which is controlled by the solenoid and is closed when the rheostat is in normal position; substantially as described.

27. In a motor-controller the combination with a motor, of a plurality of manually-controlled circuits, a plurality of circuits for controlling the motor, each of which controls the other, and means actuated by the motor for varying the connections of the said motor-controlling circuits with the manually-controlled circuits; substantially as described.

28. In a motor-controller the combination with a motor, of a plurality of manually-controlled circuits, circuits for controlling the motor, each of which controls the other, and switches between the manually-controlled circuits and the controlling-circuits actuated by the motor for breaking the connection between a closed manually-controlled circuit and the controlling-circuit to which it is connected; substantially as described.

29. In a motor-controller the combination with a motor, of a plurality of manually-controlled circuits, an up-circuit and a down-circuit for controlling the motor, each of which circuits controls the other, and means actuated by the motor for varying the connection of the up and down circuits with the manually-controlled circuits; substantially as described.

30. In a rheostat comprising a solenoid and a resistance, a shunted switch in circuit with the solenoid and constructed so as to be engaged by the plunger of the solenoid when the rheostat is fully operated, and a contact in a branch from the source of supply to the solenoid and constructed so as to be closed by the plunger of the solenoid when the rheostat is returned to normal position; substantially as described.

31. The combination, with elevator mechanism and with separate independently-actuated limit-switches adapted to be connected with electric circuits, of a rotary support for the switch-actuating means, and means for moving the support synchronously with the movement of the elevator mechanism; substantially as described.

32. The combination, with elevator mechanism, and limit-switches adapted to be connected with electric circuits, of a rotary support, switch-contact-actuating devices adjustably mounted on the support, and means for moving the support synchronously with the movement of the said elevator mechanism; substantially as described.

33. The combination, with elevator mechanism and with limit-switches adapted to be connected with electric circuits, of a rotary shaft, switch-contact-actuating arms adjustably mounted on the shaft, and means for moving the shaft synchronously with the movement of the elevator mechanism; substantially as described.

34. In an electric elevator system, an up-circuit and a down-circuit, limit-switches in each circuit, arms engaging with the limit-switches, a shaft to which the arms are adjustably secured and means for rotating the shaft synchronously with the movement of the elevator mechanism; substantially as described.

35. The combination, with elevator mechanism and with a controlling-circuit therefor, of suitable closing devices in branches of the controlling-circuit, and floor limit-switches in series with the circuit-closing devices, a rotary support, switch-contact-actuating devices adjustably mounted on the support, and means for moving the support synchronously with the movement of the elevator mechanism; substantially as described.

36. The combination of a circuit-closer, a circuit for the circuit-closer, an up controlling-circuit and a down controlling-circuit, separate independently-actuated switches mounted on a common support, one adapted to connect the circuit-closing circuit with the up controlling-circuit and one adapted to connect the said circuit-closing circuit with the down controlling-circuit, and means for operating the switches from some moving part of the apparatus; substantially as described.

37. In an electric elevator system, a controlling-circuit, an up-relay and a down-relay in branches of the controlling-circuit, circuit-closing devices in both branches of the controlling-circuit, limit-switches in both branches of the controlling-circuit in series with the circuit-closing devices, arms engaging with the limit-switches, a shaft to which the arms are adjustably secured, and means for rotating this shaft synchronously with the movement of the elevator; substantially as described.

38. In an electric elevator system, an up-circuit and a down-circuit, a controlling-circuit and an up-relay and a down-relay in branches of the controlling-circuit for controlling contacts in the up-circuit and in the down-circuit, circuit-closing devices in both branches of the controlling-circuit, limit-switches in both branches of the controlling-circuit in series with the circuit-closing devices, limit-switches in the up-circuit and in the down-circuit, arms engaging with the limit-switches, a shaft to which the arms are adjustably clamped, and means for rotating the shaft synchronously with the movement of the elevator mechanism; substantially as described.

39. In an elevator system, the combination of a controlling-circuit, circuit-closing devices in branches of the controlling-circuit and located at the several elevator-landings, floor limit-switches in each branch of the controlling-circuit in series with the circuit-closing devices, arms engaging with the floor limit-switches, a shaft to which the arms are adjustably clamped, and means for rotating this shaft synchronously with the movement of the elevator mechanism; substantially as described.

40. In an apparatus for controlling elevators, the combination with a motor, switches for each landing, circuits including the switches for controlling the motor, each of which circuits controls the others, and means operated by any switch to lock the others; substantially as described.

41. In an apparatus for controlling elevators, the combination with a motor, of a reverser therefor, switches for each landing, circuits including the switches and reverser, means operated by any switch to lock the others, and means governed by the reverser to prevent reversal of the motor during its operation; substantially as described.

42. In an apparatus for controlling elevators, the combination with a motor for operating the car and its driving-circuit, of a reversing-switch therefor, switches and controlling-circuits and connections for operating the reverser whereby when any switch is operated the motor is moved to bring the car to a position corresponding to the switch, and means in the controlling-circuit operated by the reversing-switch for preventing a reversal of the said switch while the motor is in operation; substantially as described.

43. In an apparatus for controlling elevators, the combination with a motor, of switches, circuits for each landing, a plurality of circuits for controlling the motor, each of which controls the other, means actuated by any switch to lock the others, and means operating with the elevator for connecting the switch-circuits with the controlling-circuits; substantially as described.

44. In an apparatus for controlling elevators, the combination with a motor, of a plurality of circuits including switches for each landing, an up-circuit and a down-circuit for controlling the motor, each of which circuits controls the other, and means operated by the movement of the elevator for varying the connections of the switch-circuits with the up and down circuits; substantially as described.

45. In an apparatus for controlling elevators, the combination with a motor, of a reverser and a rheostat therefor, circuits and connections including switches for each floor or station for energizing the reverser, means for controlling the rheostat connections, and means for preventing the operation of the reverser unless said controlling means is in normal position; substantially as described.

46. In an apparatus for controlling elevators, the combination with a motor, a rheostat and means for controlling the rheostat connections, of switches for each floor or station, an up-relay and a down-relay, circuits and connections including the switches and relays for controlling the operation of the motor, and means controlled by the operation of the means for controlling the rheostat connections for preventing the closure of a relay-circuit unless the means for controlling the rheostat connections is in normal position; substantially as described.

47. In an apparatus for controlling elevators, the combination with a motor and a circuit-closer therefor, a rheostat and means for controlling the rheostat connections, switches for each floor or station, controlling circuits and connections including the switches for the circuit-closer, and means for preventing the operation of the circuit-closer, unless the means for controlling the rheostat connections is in normal position; substantially as described.

48. In an apparatus for controlling elevators, the combination with a motor and its armature resistance, of switches for each floor or station, circuits and connections including the switches for controlling the operation of the motor, and means for preventing the closure of the motor-circuits unless the said resistance is included in the armature-circuit; substantially as described.

49. In an elevator system, the combination of a car, a motor to drive the car and to be driven as a generator thereby, a source of current-supply, a resistance for the motor-armature, means for cutting out the resistance, a normally shunted resistance for the motor-field whereby a strong field for the motor is provided when first connected to the source of supply, and means independent of the current in the motor-armature to break the shunting-circuit of the field resistance after the resistance in the armature-circuit has been cut out, whereby the field for the motor is weakened; substantially as described.

50. In an elevator system, the combination of a motor, a source of current-supply, a resistance for the motor-armature, a switch for cutting out the armature resistance independently of the current in the armature, a resistance for the motor-field, a switch normally shunting the field resistance and positively moved by the movement of the armature-resistance switch to break the shunting-circuit of the said field resistance, whereby a strong field for the motor is provided when first connected to the source of supply, and whereby it is weakened after the armature resistance has been cut out; substantially as described.

51. In a controlling device for elevators, the combination of a controlling-circuit, switches in the said circuit at each landing, switches also in the circuit and located in the elevator-car and corresponding to the several landings, the car-switches being in parallel with the landing-switches, a circuit-breaker in series with the landing-switches and actuated to break the circuit thereto when the car is occupied, and locking-magnets for the landing-switches in series with both the landing and car switches; substantially as described.

52. In an elevator system, the combination of a car, a controlling-circuit therefor, a car-gate hinged so as to fold into the car and located opposite the entrance thereto, and a switch in the controlling-circuit controlled by the car-gate to open the said circuit when the gate is folded into the car; substantially as described.

53. In an elevator system, the combination of a car, a controlling-circuit, circuit-closing devices in the controlling-circuit and located at the several elevator-landings, a car-gate hinged so as fold into the car and located opposite to the entrance thereto, and a switch in the controlling-circuit and connected with the car-gate so as to be opened when the gate is folded into the car; substantially as described.

54. In an apparatus for controlling elevators, the combination with a motor, a rheostat and means for controlling the rheostat connections, of switches for each floor or station, an up-relay and a down-relay, circuits and connections including the switches and relays for controlling the operation of the motor, means for preventing the simultaneous closure of the relay-circuits, and means for preventing the closure of either relay-circuit unless the means for controlling the rheostat connections is in normal position; substantially as described.

55. In a system of electrical control, the combination with a controlled motor and its circuit, of a master-switch, controlling-magnets, actuating and maintaining circuits independent of the motor-circuit, a motor-speed controller, and means associated with said speed-controller for interrupting the actuating-circuit without interrupting the maintaining-circuit.

56. In a system of electrical control, the combination with a controlled motor and its circuit, of a master-switch, controlling-magnets, actuating and maintaining circuits independent of the motor-circuit, a motor-speed controller, and a switch associated with said speed-controller for interrupting the actuating-circuit without interrupting the maintaining-circuit.

57. In a system of electrical control, the combination with a controlled motor and its circuit, of a master-switch, controlling-magnets, actuating and maintaining circuits independent of the motor-circuit and controlled by the master-switch, a motor-speed controller, and means controlled by said speed-controller for interrupting the actuating-circuit.

58. In a system of electrical control, the combination with a controlled motor and its circuit, of a master-switch, controlling-magnets, a motor-speed controller, actuating and maintaining circuits independent of the motor-circuit and controlled by the master-switch, means controlled by said controlling-magnets for completing the maintaining-circuit, and means controlled by said speed-controller for opening the actuating-circuit after the maintaining-circuit is completed.

59. In a system of electrical control, the combination with a controlled motor and its circuit, of a master-switch, controlling-magnets, actuating and maintaining circuits independent of the motor-circuit, resistance-varying means, and means for holding the actuating-circuit open when the resistance-varying means is in any position other than its normal position.

60. In combination, a motor and its circuit, armature resistance therefor, a master controlling-switch, circuits and connections including the switches for controlling the operation of the motor, and means for preventing the closure of the motor-circuit unless the armature resistance is included therein.

61. In combination, a motor and its circuit, a rheostat, a reverser, operating means for said rheostat and reverser, a master-controller for said operating means, and means for preventing the operation of the reverser unless the movable member of the rheostat is in its normal position.

62. The combination with a motor and its circuit, of a reverser therefor, controlling-circuits independent of the motor-circuit comprising actuating-circuits for operating the reverser and maintaining-circuits for maintaining the motor-circuit connections established by the reverser when operated by the actuating-circuits, and contacts for closing the maintaining-circuit corresponding to the actuating-circuit by which the reverser is operated.

63. The combination with a motor and its circuit, of a reverser therefor, controlling-circuits independent of the motor-circuit comprising actuating-circuits for operating the reverser and maintaining-circuits for maintaining the motor-circuit connections established by the reverser when operated by the actuating-circuits, contacts for closing the maintaining-circuit corresponding to the actuating-circuit by which the reverser is operated, and contacts in the actuating-circuits opened when the reverser is operated.

64. The combination with a motor, resistance in circuit therewith, and means for controlling said resistance from a distance, of a reverser, means for operating said reverser, means for controlling said operating means from a distance, and means for preventing the operation of said reverser unless the resistance-controlling means is in its normal position.

65. The combination with a motor, a starting resistance therefor, and means for controlling said starting resistance from a distance, of a reversing-switch, means for operating said reversing-switch, means for controlling said operating means from a distance, means for rendering said operating means inoperative unless the resistance-controlling means is in its initial position, and means operatively related to said reversing-switch whereby it is maintained in the position into which it may have been thrown independent of the position of the resistance-controlling means.

66. The combination of a reverser, a speed-controlling switch, power-actuated means for operating said reverser and switch, a master-controller therefor, and means operated with the reverser for controlling the connections to the switch-operating means.

Signed by me in the borough of Manhattan, New York city, this 8th day of August, 1898.

EUGENE R. CARICHOFF.

Witnesses:
SAMUEL W. BALCH,
HAMPTON D. EWING.